(12) United States Patent
Dusad

(10) Patent No.: US 11,778,001 B2
(45) Date of Patent: Oct. 3, 2023

(54) CONFERENCING APPLICATION WITH INSTANT MESSAGING PERSONA

(71) Applicant: Avaya Management L.P., Santa Clara, CA (US)

(72) Inventor: Manish Dusad, Galway (IE)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/915,514

(22) Filed: Jun. 29, 2020

(65) Prior Publication Data

US 2021/0409462 A1    Dec. 30, 2021

(51) Int. Cl.
*H04L 65/401* (2022.01)
*H04L 12/18* (2006.01)
*H04L 65/403* (2022.01)

(52) U.S. Cl.
CPC ...... *H04L 65/4015* (2013.01); *H04L 12/1822* (2013.01); *H04L 12/1831* (2013.01); *H04L 65/403* (2013.01)

(58) Field of Classification Search
CPC ............. H04L 65/4015; H04L 12/1822; H04L 12/1831; H04L 65/403; H04L 51/21; H04L 51/216
See application file for complete search history.

(56) References Cited

U.S. PATENT DOCUMENTS

| | | | |
|---|---|---|---|
| 8,000,747 B2 * | 8/2011 | Zinn | H04M 1/72436 455/566 |
| 8,638,919 B2 | 1/2014 | Deluca | |
| 8,654,953 B2 | 2/2014 | Boss et al. | |
| 9,224,131 B2 * | 12/2015 | Gruen | G06Q 10/107 |
| 9,853,824 B2 | 12/2017 | Zimmet et al. | |
| 10,594,502 B1 * | 3/2020 | Soroker | H04M 7/006 |
| 10,659,243 B1 * | 5/2020 | Soroker | H04L 12/1831 |
| 10,680,986 B1 * | 6/2020 | Wu | H04L 51/04 |
| 10,708,216 B1 * | 7/2020 | Rao | H04L 51/52 |
| 10,771,272 B1 * | 9/2020 | Ghanaie-Sichanie | H04N 21/64738 |
| 10,812,539 B2 * | 10/2020 | Chen | H04L 65/403 |
| 10,999,089 B1 * | 5/2021 | Soroker | H04L 12/1827 |
| 11,012,445 B1 * | 5/2021 | Jamison | H04L 63/104 |
| 11,394,570 B1 * | 7/2022 | Soroker | H04L 51/046 |

(Continued)

OTHER PUBLICATIONS

Avaya, "Instant Messaging Client Setup and Operation", 2010, 61 pages (Year: 2010).*

(Continued)

*Primary Examiner* — Jerry B Dennison
(74) *Attorney, Agent, or Firm* — Sheridan Ross P.C.

(57) ABSTRACT

Not every person can or should join an electronic conference (herein, "conference") where they may contribute content to the conference. While a first set of participants are communicating, a question may arise to be addressed to an additional participant not participating in the conference. Rather than executing the overhead of joining the conference, a separate communication channel is established, such as via an instant messaging application of the additional participant. The additional participant is presented with a message, such as a question, which may indicate the sender is the conference itself. The additional participant replies via their IM application which is delivered to each of the conference participants and optionally included in a recording of the conference.

20 Claims, 8 Drawing Sheets

(56) References Cited

U.S. PATENT DOCUMENTS

| | | | |
|---|---|---|---|
| 11,405,228 B1* | 8/2022 | Soroker | H04L 67/1044 |
| 2005/0132009 A1* | 6/2005 | Solie | H04L 51/04 |
| | | | 709/206 |
| 2008/0096603 A1* | 4/2008 | Sparre | H04M 1/7243 |
| | | | 455/550.1 |
| 2008/0256189 A1* | 10/2008 | Lyle | H04L 51/04 |
| | | | 709/206 |
| 2008/0256190 A1* | 10/2008 | Ryan | H04L 12/1831 |
| | | | 709/206 |
| 2009/0024932 A1* | 1/2009 | Ryan | H04L 51/04 |
| | | | 715/753 |
| 2011/0267987 A1* | 11/2011 | Asthana | H04L 12/18 |
| | | | 370/260 |
| 2012/0128146 A1* | 5/2012 | Boss | H04M 3/42221 |
| | | | 379/202.01 |
| 2012/0191788 A1* | 7/2012 | Mellen | G06Q 10/06311 |
| | | | 709/206 |
| 2012/0229588 A1* | 9/2012 | Greenfield | H04N 21/47202 |
| | | | 348/E7.083 |
| 2013/0185363 A1* | 7/2013 | DeLuca | H04L 51/16 |
| | | | 709/206 |
| 2015/0227501 A1* | 8/2015 | Farjo | G16H 30/40 |
| | | | 715/230 |
| 2015/0293670 A1* | 10/2015 | Kim | G06Q 10/107 |
| | | | 715/752 |
| 2015/0350148 A1* | 12/2015 | Kenney | H04L 51/12 |
| | | | 709/206 |
| 2016/0323235 A1* | 11/2016 | Lindsay | H04L 51/04 |
| 2016/0344567 A1* | 11/2016 | Navale | H04L 65/4038 |
| 2016/0373388 A1* | 12/2016 | Katis | H04W 4/70 |
| 2017/0085506 A1* | 3/2017 | Gordon | H04L 51/046 |
| 2017/0230432 A1* | 8/2017 | Vuong | G06Q 50/01 |
| 2017/0310717 A1* | 10/2017 | Staples | H04L 51/046 |
| 2018/0302357 A1* | 10/2018 | Cohen | H04L 51/212 |
| 2019/0007362 A1* | 1/2019 | Shmunis | H04L 51/046 |
| 2019/0238489 A1* | 8/2019 | Cohen | H04L 51/216 |
| 2020/0296054 A1* | 9/2020 | Asawa | G06F 9/445 |
| 2021/0149921 A1* | 5/2021 | Alexander | G06N 3/006 |
| 2022/0103510 A1* | 3/2022 | Clarke | G06Q 10/063112 |

OTHER PUBLICATIONS

Avaya, "Using Avaya Aura Conferencing", 2011, 158 pages (Year: 2011).*

Finnegan, Matthew; ComputerWorld, "Slack embraces email to bridge chat app gap"; https://www.computerworld.com/article/3391280/slack-embraces-email-to-bridge-chat-app-gap.html; Apr. 26, 2019 (Year: 2019).*

Official Action for India Patent Application No. 202114027355, dated Mar. 17, 2022 6 pages.

* cited by examiner

CONFERENCING APPLICATION WITH INSTANT MESSAGING PERSONA

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for establishing a second ad hoc additional network of communicating nodes comprising an existing network of nodes and particularly to management and routing of messages to and from nodes.

BACKGROUND

Currently, when two or more participants are engaged in a conference session, those conference participants can only chat between themselves, such as via a conferencing chat window. If a they wish to ask another party, not engaged in the conference, a question, at least one of them will need to utilize another communication tool and conduct a sidebar communication, invisible to the other conference participants, or invite the other party into the communication.

SUMMARY

Prior solutions only enable conference participants to chat among themselves. If a conference participant or set of conference participants desire to chat with someone not currently engaged in their conference, then a separate tool/application is required to facilitate the chat or the other party needs to join the conference. Such solutions have drawbacks. If a sidebar communication is established with the other party, the remaining conference participants are excluded from the sidebar communication, this may waste time and other resources as other discussions may not be desirable while one of the participants is engaged in the sidebar communication. While the other party may be invited into the conference, this is not always desirable or practical. For example, a participant may be presently be able to communicate via a smart phone in one form, such as via instant messaging (IM), short message service (SMS), or other text-based communication, but needs to have a particular conferencing client installed, launch the client, authenticate, or otherwise select the right virtual conference and then be joined into the conference. For a quick question, this may represent a prohibitive amount of overhead. There may be other reasons why joining a conference is not possible. For example, the other participant may be currently engaged in anther meeting, in person or virtually. While time may permit providing a response to a quick question presented in text, launching an application, especially if it is currently engaged, may not be possible.

Another drawback of sidebar conversations is their absence from a recording, such as a video and/or voice recording, or text transcript either as provided by the participants or as transcribed by a speech-to-text application. If the contents of the sidebar conversation are to be included in a recording, the conference participant who engaged in the conversation must insert it. This provides an opportunity to introduce errors by either omission or by incorrectly providing the content of the sidebar conversation.

As a general introduction, and in one embodiment, a conference is established between a number of participant using a plurality of endpoints. It should be appreciated that, as used herein, "conference" refers to electronic communications between endpoints as nodes on a network. While two or more participants may be physically co-located and utilize the same endpoint, communications between such co-located participants are distinct, and excluded from, the communications described in the embodiments herein. The embodiments, aspects, and configurations herein are solely directed to electronic communications between two or more endpoint.

These and other needs are addressed by the various embodiments and configurations of the present invention. The present invention can provide a number of advantages depending on the particular configuration. These and other advantages will be apparent from the disclosure of the invention(s) contained herein.

In one embodiment, a conference application is provided to facilitate conference participants being able to chat with individuals outside of the conference, present the conference participants as a "conference entity" to individuals outside of the conference, and still capture content exchanged during the chat as part of the conference content.

In another embodiment, systems and methods are provided for conference participants to send messages (e.g., chat or IM messages) to a person who is not a part of the conference. The recipient of the message can receive the message via their preferred IM/chat application and can respond from that same application. The content of their response may then be presented to the conference participants via a conference chat window.

Consider the following example:

Bob and Joe are in a conference session discussing some topic.

During the conference session, Bob and Joe realize they have a question for Mary, who is not a conference participant and was not invited to the conference Using the conference chat function, Bob or Joe search for Mary in a corporate directory and send a chat/IM message to Mary Mary will receive the message on her IM tool (e.g., Google Hangout) and a conversation can ensue.

In one embodiment, the combination of Bob, Joe, and the Conference Room is presented as a single entity/persona to Mary and Mary knows she is chatting with Bob and Joe in a conference setting. In another embodiment, either Bob or Joe are presented to Mary and Mary knows she is chatting with Bob or Joe in a conference setting. In yet another embodiment, either Bob or Joe are presented to Mary and Mary does not know she is chatting with Bob or Joe in a conference setting.

The content exchanged during the chat between Mary and Bob/Joe/Conference Room may be considered part of the conference session, which means the content can be recorded as part of the conference session. Appropriate announcements and disclaimers may be required (especially for Mary), but content of the chat with a non-participating third party could be incorporated into a recording of the conference session In another embodiment, such as later during the conference session (before or after the chat with Mary has concluded), Bob or Joe may further send an IM/chat message to Sam, who is using Skype. Sam will receive the message on his Skype client and start a conversation with Bob/Joe/Conference Room in a similar fashion as their conversation with Mary. The content of the conversation with Sam may be presented adjacent to the content of the conversation with Mary (e.g., in the chat window of the conference session). Again, this content could become part of the conference session and be recorded as such.

In some embodiments, each instance of a meeting may present a different and unique IM/chat persona to a recipient. Alternatively, it may be possible for a single instance of a conference room to present the same persona to a recipient (e.g., "Bob's Conference Room").

To extend the concept further, it may be possible to enable the conference participants to add both Mary and Sam into conversation at the same time. This may cause all messages transmitted by the conference persona to be forwarded to both Mary and Sam. Mary's chat window will show her view of the conferencing room (Joe, Bob and "Sam") and similarly Sam's chat window will show his view of the conferencing room (Joe, Bob and "Mary").

In one embodiment, a system is disclosed, comprising: a server comprising at least one processor comprising instructions maintained in a non-transitory memory; a network interface to a first network; wherein the server performs: establishing a first communication between a first set of nodes comprising a plurality of endpoints, wherein a first message from any member of the first set of nodes is provided to all other members of the first set of nodes, exclusively; and establishing a second communication between a second set of nodes comprising an additional endpoint and a conferencing entity node comprising each of the first set of nodes, wherein a second message from any member of the second set of nodes is provided to all other members of the second set of nodes.

In another embodiment, a method is disclosed, comprising: establishing a first communication between a first set of nodes comprising a plurality of endpoints, wherein a first message from any member of the first set of nodes is provided to all other members of the first set of nodes, exclusively; and establishing a second communication between a second set of nodes comprising an additional endpoint and a conferencing entity node comprising each of the first set of nodes, wherein a second message from any member of the second set of nodes is provided to all other members of the second set of nodes.

In another embodiment, a system is disclosed, comprising: means to establish a first communication between a first set of nodes comprising a plurality of endpoints, wherein a first message from any member of the first set of nodes is provided to all other members of the first set of nodes, exclusively; and means to establish a second communication between a second set of nodes comprising an additional endpoint and a conferencing entity node comprising each of the first set of nodes, wherein a second message from any member of the second set of nodes is provided to all other members of the second set of nodes; and wherein the first communication differs from the second communication with respect to at least one of a communication host utilized, a message format, a message protocol, a communication setup protocol, security protocol, encryption, or a type of message comprising voice or text.

Aspects of the embodiments include methods and systems, wherein the first communication differs from the second communication with respect to at least one of a communication host utilized, a message format, a message protocol, a communication setup protocol, security protocol, encryption, or a type of message comprising voice or text.

Aspects of the embodiments include methods and systems, wherein the first set of nodes comprises a recording server.

Aspects of the embodiments include methods and systems, wherein the server further performs: recording the communications of both the first communication and the second communication; making accessible, to an address associated with each participant of each of the first set of nodes and omitting any address associated with a participant of the additional node, the recording of the first communication and the second communication; and making accessible, to an address associated with a participant of the additional node, the recording of the second communication and omitting sending the first communication.

Aspects of the embodiments include methods and systems, wherein the recording is a textual transcription.

Aspects of the embodiments include methods and systems, wherein the second communication occurs during the first communication.

Aspects of the embodiments include methods and systems, wherein the server further performs: receiving a message draft from one of the first set of nodes; causing a prompt to be presented on the one of the first set of nodes to select a destination comprising the first communication or the second communication; and upon receiving a reply to the prompt indicating the first communication, sending the message draft to the first set of nodes; and upon receiving the reply to the prompt indicating the second communication, sending the message draft to the second set of nodes.

Aspects of the embodiments include methods and systems, wherein the server performs the establishing of the second communication between the second set of nodes comprising the additional endpoint and the conferencing entity node, further comprising performing: formatting an invitation message to join a conference; sending the invitation message to the additional endpoint; and upon receiving indicia of acceptance in response to the invitation message, establishing the second communication.

Aspects of the embodiments include methods and systems, wherein the server performs formatting the invitation message further comprising automatically inserted previously determined text.

Aspects of the embodiments include methods and systems, wherein the server performs formatting the invitation message further comprising: causing at least one of the first set of nodes to present a prompt to provide indicia of the conferencing entity node; and in response to receiving a response to the prompt to identify the conferencing entity node, formatting the invitation to indicate the invitation is from the indicia of the conferencing entity node.

Aspects of the embodiments include methods and systems, wherein the first communication differs from the second communication with respect to at least one of a communication host utilized, a message format, a message protocol, a communication setup protocol, security protocol, encryption, or a type of message comprising voice or text.

Aspects of the embodiments include methods and systems, further comprising recording the communications of both the first communication and the second communication; sending, to an address associated with each participant of each of the first set of nodes and omitting any address associated with a participant of the additional node, the recording of the first communication and the second communication; and sending, to an address associated with a participant of the additional node, the recording of the second communication and omitting sending the first communication.

Aspects of the embodiments include methods and systems, wherein the recording further comprises creating a textual transcription.

Aspects of the embodiments include methods and systems, further comprising: receiving a message draft from one of the first set of nodes; causing a prompt to be presented on the one of the first set of nodes to select a destination comprising the first communication or the second communication; and upon receiving a reply to the prompt indicating the first communication, sending the message draft to the first set of nodes; and upon receiving the reply to the prompt indicating the second communication, sending the message draft to the second set of nodes.

Aspects of the embodiments include methods and systems, wherein establishing of the second communication between the second set of nodes comprising the additional endpoint and the conferencing entity node, further comprising: formatting an invitation message to join a conference; sending the invitation message to the additional endpoint; and upon receiving indicia of acceptance in response to the invitation message, establishing the second communication.

Aspects of the embodiments include methods and systems, wherein formatting the invitation message further comprising automatically inserted previously determined text.

Aspects of the embodiments include methods and systems, wherein formatting the invitation message further comprises: causing at least one of the first set of nodes to present a prompt to provide indicia of the conferencing entity node; and in response to receiving a response to the prompt to identify the conferencing entity node, formatting the invitation to indicate the invitation is from the indicia of the conferencing entity node.

Aspects of the embodiments include methods and systems, further comprising:

means to record the communications of both the first communication and the second communication; means to send, to an address associated with each participant of each of the first set of nodes and omitting any address associated with a participant of the additional node, the recording of the first communication and the second communication; and means to send, to an address associated with a participant of the additional node, the recording of the second communication.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
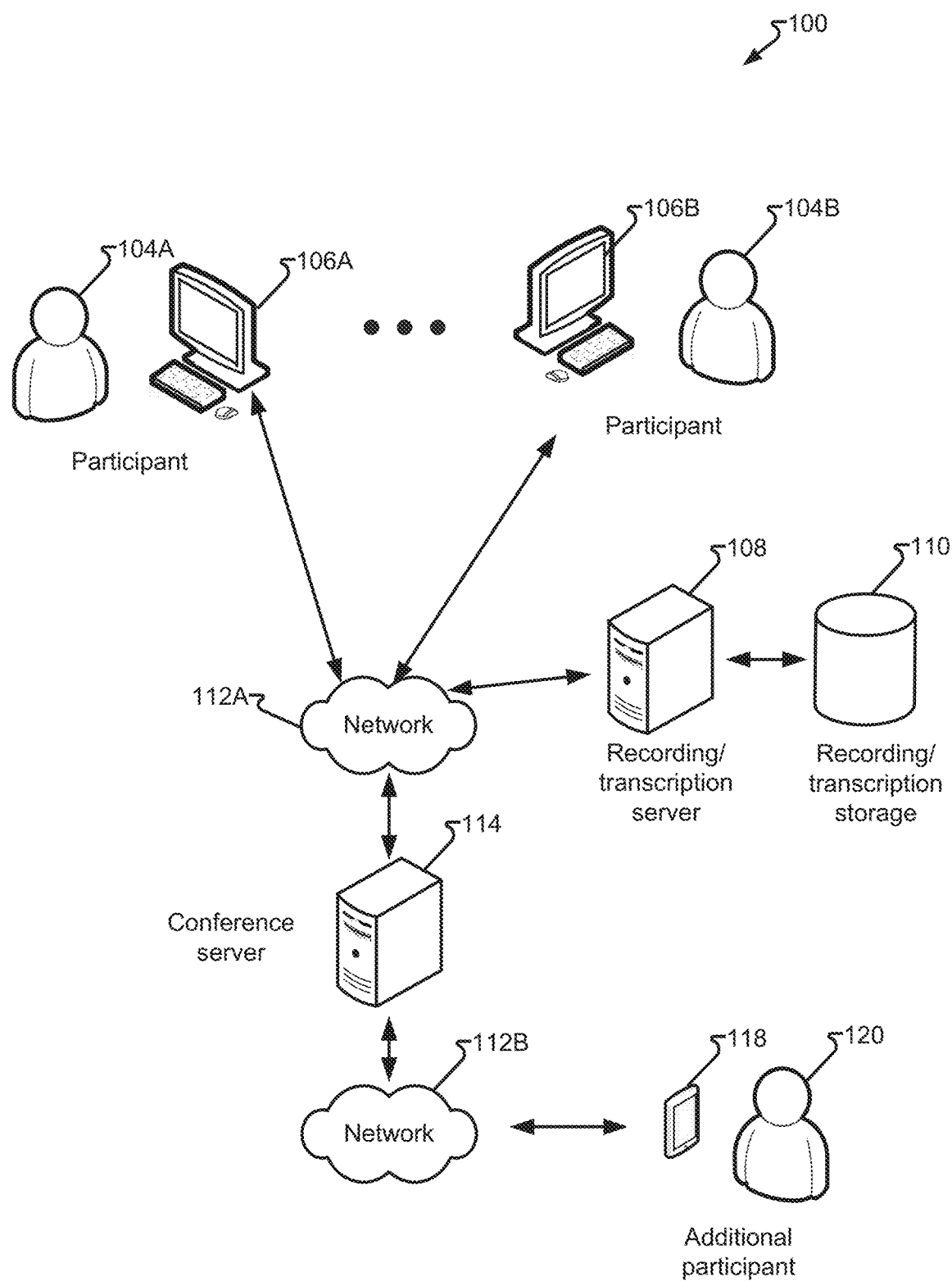
FIG. 1 depicts a system in accordance with embodiments of the present disclosure.

FIG. 1 depicts system 100 in accordance with embodiments of the present disclosure. System 100 depicts one network topology comprising a first set of nodes engaged in an electronic conference utilizing network 112 (or more simply, "conference"). The first set of nodes comprises at least two endpoints 106A-B associated with participants 104A-B, respectively. Optionally, the first set of nodes may comprise recording server 108 to record the conference and maintain the recording in recording storage 110.

It should be appreciated that other network topologies may be provided without departing from the scope of the embodiments provided herein. For example, while network 112A may connect each endpoint 106 and optionally recording server 108, in other embodiments, functionality provided by server 114 may be embodied in one of endpoint 106. Similarly recording server 108 and recording storage 110 may be combined with the same endpoint 106, performing the functions of server 114, or a different endpoint 106.

Server 114 may comprise one or more processors having, or having access to, a non-transitory memory with instructions thereon that when read by the one or more processors, cause the processor to execute the instructions encoded therein. Server 114 may comprise or communicate with other components (not shown) for the purposes of establishing and maintaining communications, such as switches, trunks, routers, etc. Server 114 may execute conferencing services such as to control additions or deletion of participants to the conference, agenda management, floor control, etc. Server 114 may also comprise or access a non-transitory data storage to maintain data accessible to the one or more processors.

Network 112 is illustrated as two distinct elements of system 100. For example, network 112A may be an intra-net, Internet, first VPN, or other network distinct from network 112B, which may be, for example, a cellular telephone network, the Internet, different VPN, etc. As a result, network 112A may differ from network 112B in terms of equipment, protocols, security features, encryption, message formats, address formats, signaling, application, etc. In another embodiment, network 112A differs from network 112B in at least one of physical layer, data link layer, network layer, transport layer, session layer, presentation layer, and/or application layer as described in the Open System Interconnection Model (OSI model). In yet another embodiment, network 112A and network 112B are differentiated by the nodes communicating thereon. Such as additional node 118 communicating with server 114 being network 112B and endpoint 106A-B communicating with server 114 being network 112A.

In one embodiment, the conference comprising the first set of nodes is conduced via text messages. In another embodiment the conference comprising the first set of nodes is conducted as voice messages and optionally audio-video. For example, each of endpoint 106 may execute a conferencing application, such as to be presented with a conferencing interface comprising text messages, audio messages (received via a network interface to network 112, decoded, and presented to a speaker/headset and/or encoded from signals provided by a microphone associated each associated with a respective endpoint 106), video messages (received via a network interface to network 112, decoded, and presented on a display and/or encoded from signals provided by a camera each associated with a respective endpoint 106). As a further embodiment, additional node 118 may utilize network 112B to send and/or receive messages as text, voice, or audio-video. Messages of one type (e.g., text, audio, audio-video) may be converted to a different type based on the message sender and/or recipient's preference or to accommodate message types that a particular endpoint (e.g., endpoint 106A-B, additional node 118) is able to receive and/or process. For example, additional node 118 may be capable of text, audio, and audio-video communications, but based on an input from addition participant 120 only wishes to receive text messages. Accordingly, audio messages may be transcribed into text, audio-video messages may similarly be transcribed with the video portion omitted. Conversely, addition participant 120 may be driving or otherwise prefer to communicate in voice and receive a text message. Accordingly, the text message may be processed via an associated text-to-speech function and presented as spoken text. Similarly, addition participant 120 speaking may be transcribed sent as text.

During a conference between participant 104A and participant 104B, via endpoint 106A and endpoint 106B, respectively, a question or issue arises that requires notification to or input from addition participant 120. Generally, this may be a quick question (e.g., "How many units were sold last month?), but it may be a notification (e.g., "Expect an update to the sales figures in one hour."). Inviting addition participant 120 into the conference may be burdensome, such as when a conferencing application needs to be installed, launched, authenticated, etc. and especially so if only a quick question is to be asked. Inviting addition participant 120 into the conference also assumes addition participant 120 has the correct conferencing application available and the current ability to perform the necessary overhead to launch and sign-in to the correct electronic conference room or account. Similarly, the quick question may be asked during a sidebar conversation, such as between participant 104A and addition participant 120, which may comprise a different communication device (not shown) such as a cellular telephone or a different communication application running on endpoint 106A. During the sidebar conversation, the conference stalls. The other participants (e.g., participant 104B and/or others) are either force to discuss other topics, which may require repeating the conversation once participant 104A returns, excluding participant 104A from that portion of the conversation that may result in errors or misunderstandings, or halting the conference (e.g., being silent, small talk, off-topic conversations, etc.) until participant 104A returns.

However, in accordance with the embodiments herein, an endpoint, such as endpoint 106A initiates a second communication on behalf of the conference, as an aggregate of all participants 104 and/or endpoints 106 with the addition participant 120, such as via a text message. A text message may be an instant message (IM), (e.g., Facebook Messenger, Google Hangouts, etc.), Short Message System (SMS), Short Message System-Point to Point (SMSPP), eXtensible Messaging Presence Protocol (XMPP), and/or other standardized or proprietary text-based message format. Replies from addition participant 120 via additional node 118 are then included into the conference, such as within a thread of text, when the conference is text-based, or as a text component to an audio or audio-video conference. Additionally, recording server 108 may include the response in a recording and/or transcription of the conference.

Figure 2A:
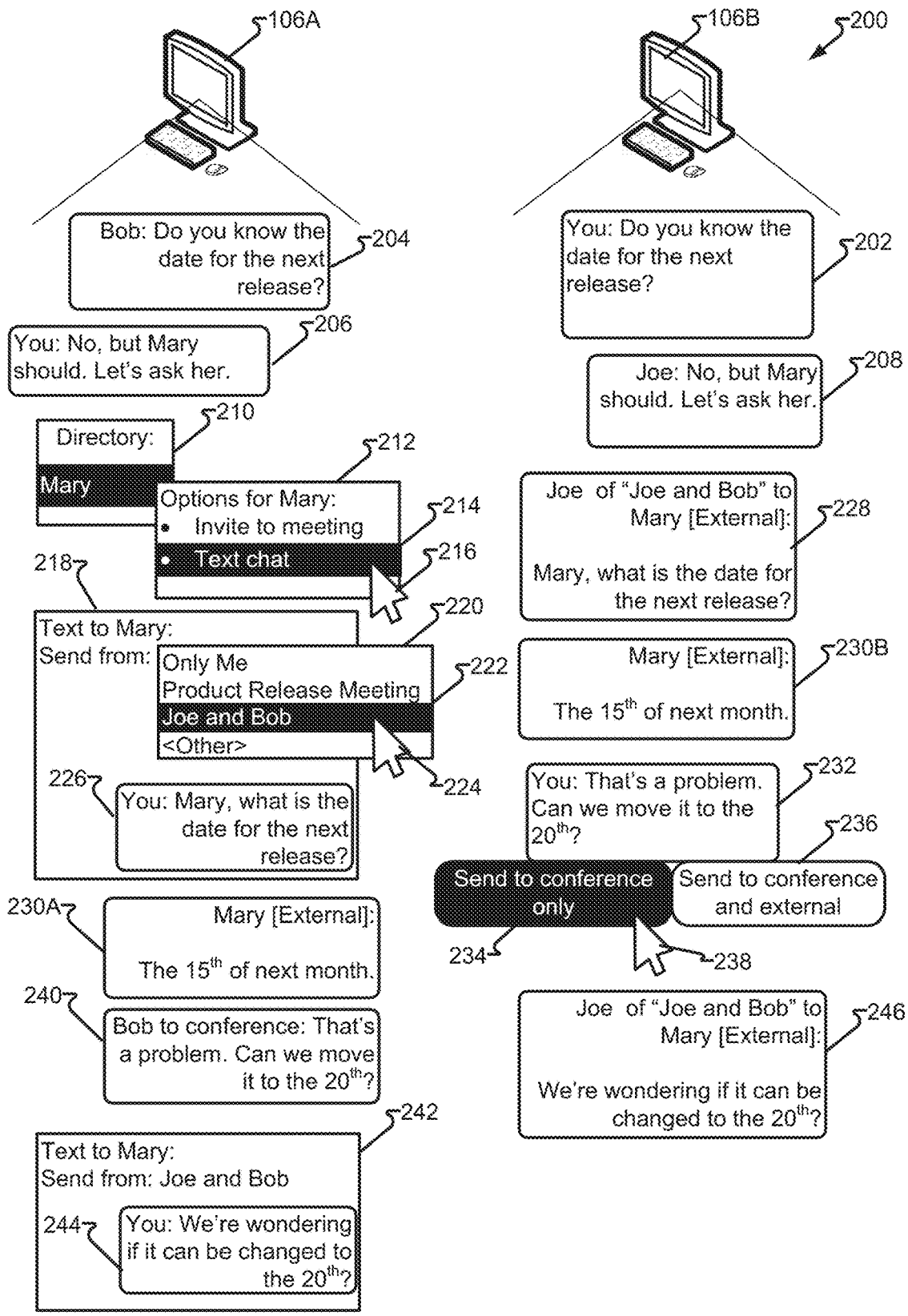
FIGS. 2A-B depict a first interaction in accordance with embodiments of the present disclosure.
Figure 2B:
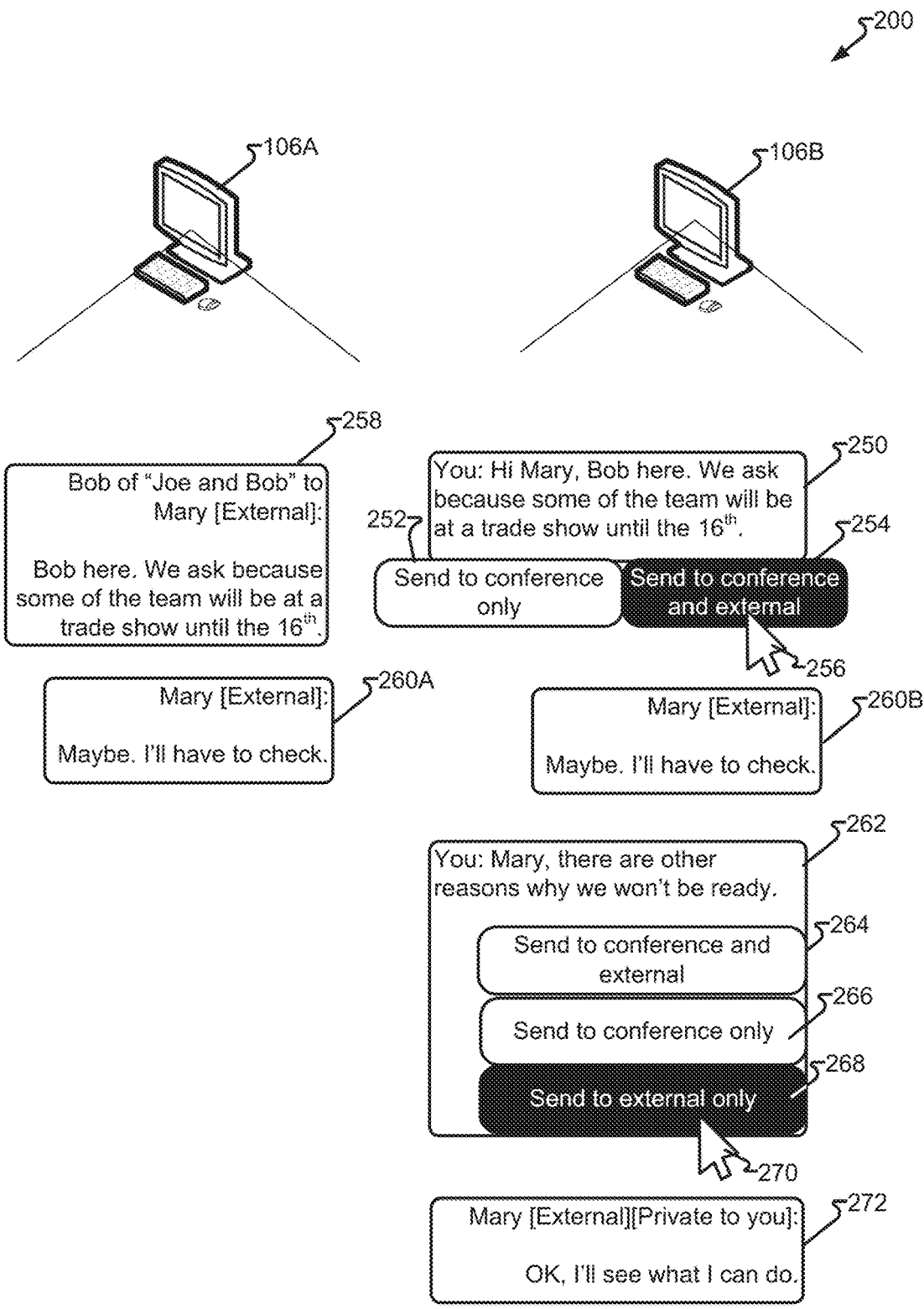

FIGS. 2A-B depict interaction 200 in accordance with embodiments of the present disclosure. Interaction 200 comprises messages and actions presented on endpoint 106A and/or endpoint 106B, such as may be presented by a conferencing application executing locally on endpoint 106A, locally on endpoint 106B, or remotely on a server (not shown), or a combination thereof.

It should be appreciated that interaction 200 may be implemented on applications executing on endpoint 106A and/or endpoint 106B as an integrated conferencing application, dialog-specific windows within a conferencing application, or other presentation device for presentation of text and/or receiving textual input to participant 104A and participant 104B, respectively. However, it should be appreciated that the first communication of the conference, wherein endpoint 106A and 106B and any other conference participants exchange messages, may comprise text, voice, and/or audio-video messages. For example, one or more messages 202, 204, 206, and 208 may be text, as illustrated, or spoken voice, conveyed as encoded sound messages on network 112A or the aggregate network 112.

In one embodiment, interaction 200 illustrates a first communication comprising a conference between endpoint 106A and endpoint 106B. The initial communication may comprise messages 202, 204, 206, and 208. The participants (e.g., participant 104A and/or participant 104B) identify a question to be answered by an external party, such as addition participant 120 via additional node 118. The question may be quick or otherwise make inviting addition participant 120 into the conference unwarranted.

Endpoint 106A presents directory 210. Directory 210 may be stored locally on endpoint 106A or access a directory stored on elsewhere, such as corporate server (e.g., light-weight directory assistance protocol (LDAP)). Options 212 are presented to invite a non-conference participant (e.g., "Mary"). A selection, such as via mouse pointer 216 operating on endpoint 106A, selects text chat 214. Next, window 218 is presented on endpoint 106A and presents prompt 220 to receive an input as to who will send the text. Options presented by prompt 220 may include the name of the conference, the names of all the participants, the names of a subset of all the participants, the name of the participant associated with endpoint 106A (e.g., participant 104A) or a customized name. A selection may be made with mouse pointer 224, such as to select option 222 wherein the "from" of the message will be the names of the participants of the conference engaged in the first communication.

Text 226 is received and sent as a message. The message is presented to all participants of the first communication, including endpoint 106B receiving message 228. Optionally, a node, such as endpoint 106A may omit presenting messages of any communication that originate from the same node.

Messages 230A and 230B are received as part of a second communication of the conference, the second communication including a non-participating endpoint of the conference, such as additional node 118.

In another embodiment, after the inclusion of a message on a second communication to and/or from non-participating conference participant (e.g., addition participant 120), subsequent messages may prompt for an input asking which communication the message is to be a part of. For example, message 232 may now comprise first send option 234, wherein the message will be a component of the first communication and omit all non-participating conference participants (e.g., addition participant 120 not privy to the first communication or messages solely within the first communication) or option 236 wherein the message will be a component of the second communication comprising all conference participants and some or all additional conference participants (e.g., addition participant 120). Here, mouse pointer 238, an input device of endpoint 106B, selects option 234 and message 232 is sent to conference participants only and omitting delivery to additional node 118. Message 232 is presented to conference participants as message 240.

Next, message 244 is formatted within window 242 associated with messages provided to the second communication and delivered to all conference participants devices as message 246 as well as additional node 118.

Messages from endpoints, such as endpoint 106B that did not originate the second communication comprising additional node 118, may be sent as messages of the first or second communication. For example, draft message 250 may be provided with prompt 252 to send as a component of the first communication or prompt 254 to send as a component of the second communication, such as by selected via input (e.g., click) of mouse pointer 256. Draft message 250 is then delivered to all participants as message 258 to conference participants and additional node 118. Messages received from additional node 118 are presented as messages 260. As a further options, conference participants may communicate with additional node 118 directly and without including any conference participants (e.g., endpoint 106A) or other additional nodes (not shown). For example, draft message 262 may have various prompts for sending, including prompt 264 to send as a message of the second communication, prompt 266 to send as a message of the first communication, or prompt 268 to send as a private message to the additional node 118, such as via an input to mouse pointer 270, wherein draft message 262 is delivered only to additional node 118. Private messages may be always included, always excluded, or conditionally included as a recording maintained in additional node 118 as a matter of design choice.

In response to draft message 262 being sent as a private message, additional node 118 may respond directly to the sender (e.g., endpoint 106B) in message 272.

Figure 3A:
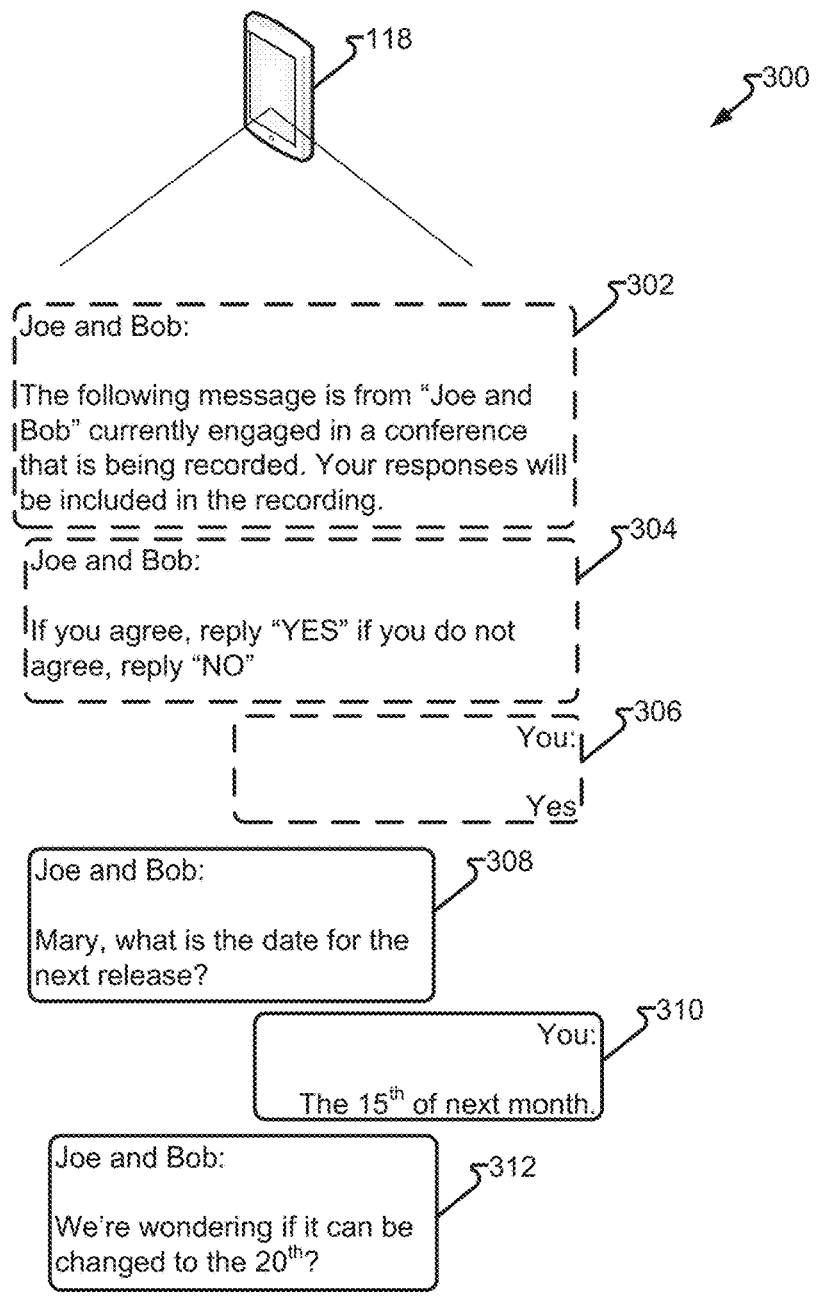
FIGS. 3A-B depict a second interaction in accordance with embodiments of the present disclosure.
Figure 3B:
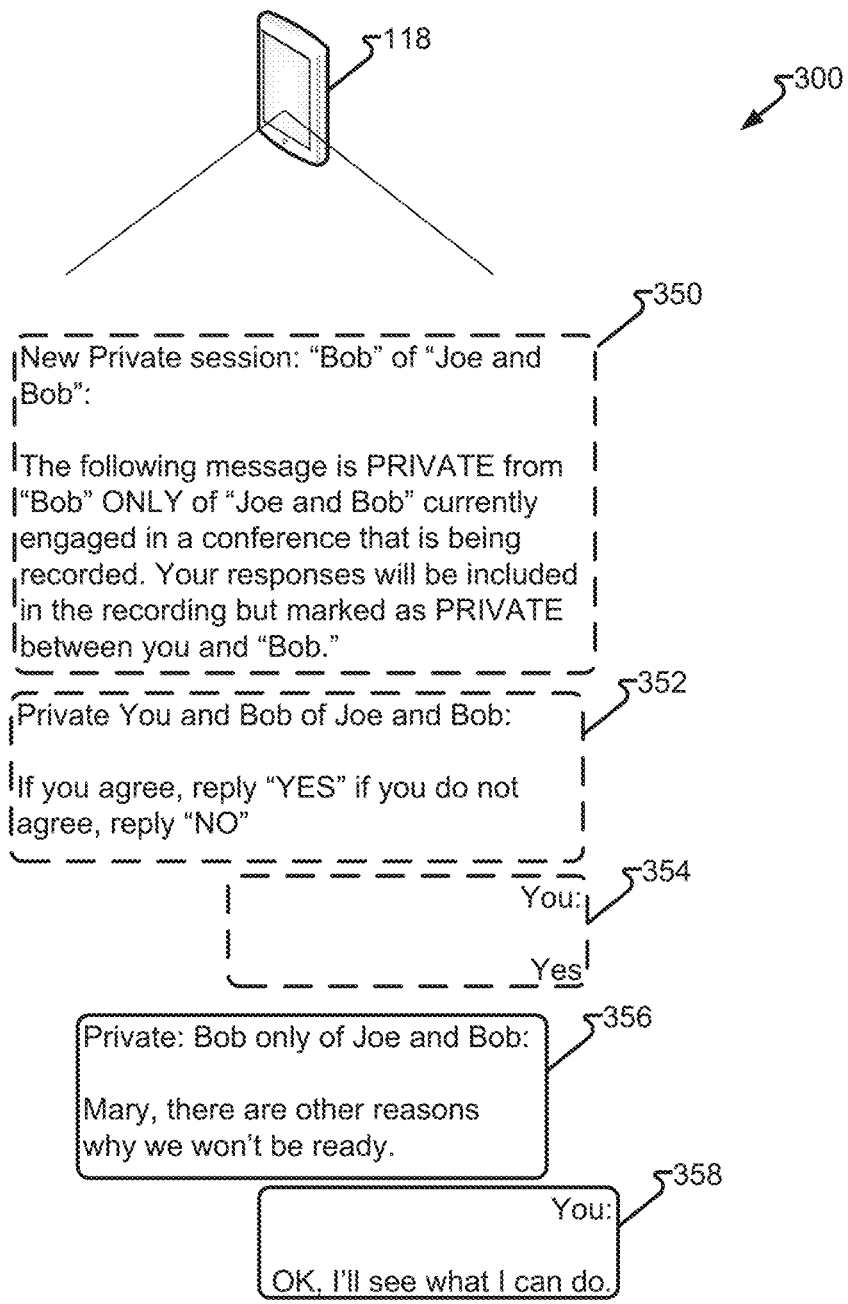

FIGS. 3A-B depict interaction 300 in accordance with embodiments of the present disclosure. In one embodiment, interaction 300 illustrates interaction 200 from the perspective of additional node 118. As described above, the identity of the sender may be identified as an aggregate of the participants, such as by listing all the names of the participants, using a meeting name, etc. Depending on the formatting rules of a utilized protocol (see FIG. 5), a properly formatted address may need to be accessed or generated. For example, server 114 may generate an address for the aggregate of participants. For example, "Joe and Bob" may be formatted into the "from" field as "joe.and.bob@txt.mycompany.net". Accordingly, when a reply message is sent, it will be addressed to the generated account and forwarded by server 114 into the conferencing application for presentation on the conferencing application utilized by endpoint 106A and endpoint 106B. As a further option, one or more telephone numbers may be maintained and dynamically assigned to a conference. For example, "Joe and Bob" may send a text as "from" a telephone number, such as "999999999@txt.mycompany.com" and any reply or other message similarly forwarded to the conference comprising "Joe" and "Bob." However, as this may be a number allocated from a pool, the number may not be valid or reassigned at some point after the conference has ended. It should be appreciated that other message addressing schemas may be utilized, wherein a message may be sent from a conference, that is from each of the participants in a conference, and routed to additional node 118 and receive message from the additional node 118 for presentation into the conferencing application and, optionally, recording thereof. Accordingly, the messages of interaction 300 may be from a generated or selected address.

Additional node 118 is not a conference participant and text message 226 may be the first message received by additional node 118 from the conference. Accordingly, previously selected text 302, 304 may be inserted by the sending node (e.g., endpoint 106A) or a communication server (e.g., server 114). This previously selected text 302, 304 may be all or partially optional, such as to include identification of the sending party, such as in response to the "from" indicated in prompt 220. It may be necessary to warn the recipient that the messages are being recorded, or take a more affirmative approach and previously selected text 304 prompts the recipient to affirmatively agree to being recorded or decline, in response 306. If response 306 declines being recorded, the sender (e.g., endpoint 106A) or all conference participants (e.g., endpoint 106A and endpoint 106B) may be notified that the recipient does not consent to the recording and allow the conference participants to seek resolution elsewhere. If response 306 consents, when required, the message may be delivered to additional node 118.

Message 308, sent as text message 226 from endpoint 106A, is presented on additional node 118. Response 310 is the formatted and sent as a reply to the sender, here, identified as the participants of the conference. Additional node 118 is excluded from messages that are components of the first communication. Message 244 is subsequently delivered as message 312. Optionally, prompting for consent, such as by resending previously selected text 302, 304 to additional node 118, may be required for each message or for each session, such as message from a particular sender (e.g., the "from" selected in prompt 220), which may be further time limited. For example, if it has been more than fifteen minutes since the last message, remind addition participant 120 that responses will be record or, if more than an hour, re-obtain consent to be recorded.

Private messages may require the sending from a different address, depending on the protocol and/or formatting of the text messages utilized by additional node 118, as will be discussed more completely with respect to FIG. 5. As an option, previously selected message 350, 352 may be provided, such as to indicate that the sender is a conference participant but sending a private message excluded from the other conferencing endpoints (e.g., endpoint 106A). As a further option, the private messages exchanged may or may not be record. If recorded, they may be marked as private, such as being made available only to the participants associated with the private message exchange (e.g., participant 104B and addition participant 120). If recorded, response 354 may require consent, obtained by receiving consent indicated in response 354. As yet another option, messages 350, 352, 356, may originate from server 114 with a "from" field generated or selected as different from the "from" field of any other message (e.g., "bob.private.bob.and.joe@txt.mycompany.net".

Draft message 262 may be private and only sent to "external only" (option 268) and is then presented as message 356 only and not to any other endpoint, with the possible exception of recording server 108, if enabled to record private messages. Response 358 is presented as message 272 on endpoint 106B.

While only three participants (e.g., participant 104A, participant 104B, and addition participant 120) are illustrated, it should be appreciated that this represents a minimum and that additional conference participants and/or addition participants 120, via their associated endpoint, may participant as either a node for the conference, and send and receive messages of the first communication and second communication, or as nodes of the second communication and only send and receive messages that are a component of the second communication. If more than one additional node 118 is utilized for the second communication, messages that are components of the second communication may be delivered to all participants, including all additional nodes 118. Alternatively, a plurality of additional node 118 may be considered as unique second communication different from the second communications of other additional nodes 118.

Figure 4:
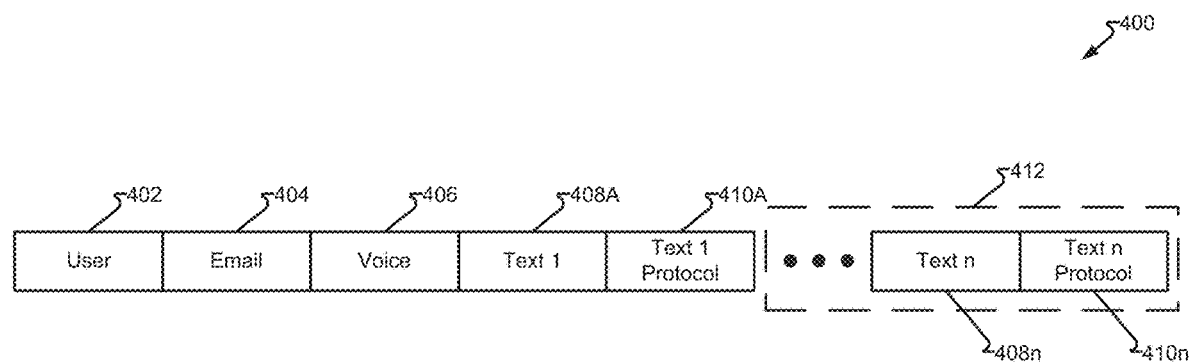
FIG. 4 depicts a data structure in accordance with embodiments of the present disclosure.

FIG. 4 depicts data structure 400 in accordance with embodiments of the present disclosure. Data structure 400 illustrates one record that may be stored as directory entry or as a component of a directory entity for addition participants 120 and/or participants 104. Data structure 400 may be maintained locally (e.g., one or more of endpoints 106 and/or additional nodes 118) or on a centralized repository, such as a data storage associated with server 114, or a combination thereof.

Data structure 400 comprises a number of fields. User field 402 maintains a username or other indicia for presentation to a user, such as to identify recipients of an invitation to become a participant in a conference and/or identify additional users, such as to be presented by directory 210. User field 402 may be or comprise a textual username (e.g., "Bob Smith"), system or machine username (e.g., user number, employee number, account name, etc.), role, rank, title, position, location, and/or other indicia associated with a user/participant. Means to electronically connect may be provided as email field 404 and/or voice field 406, which may be null, comprise one entry, or a data structure comprises a plurality of email field 404 and/or voice field 406.

Data structure 400 may comprise text field 408A and an associated text protocol 410A. Optionally, additional field 412 may be utilized each having text field 408n and associated text protocol 410n. Text field 408 provides a particular address for the participant identified in user field 402. For example, text field 408 may comprise an address on a system (e.g., "bob.smith@txt.mycompany.com", "+35391000000") or other indicia for a particular text message platform. Accordingly, associated text protocol field 410 identifies any rules or other message formats required to send a message to the associated address in text field 408. For example, text protocol filed 410 may comprise message formatting rules (e.g., sender [256 characters], recipient [256 characters], text content [1024 characters], time sent [64 characters], etc.), document type (e.g., ".bbm", ".sms", ".mms", ".ipda," ".mmssms.db", etc.). Accordingly, a text message may be drafted and sent to additional node 118 as an IM, SMS, Facebook Messenger, Google Hangouts, Skype, SIP, etc. other standardized or proprietary texting format for which additional node 118 may receive text messages. In another embodiment, text protocol field 410 may maintain encryption/decryption keys or other security information when communications are encrypted.

When a recording and/or textual translation is performed by recording server 108 and maintained in recording storage 110, access to the recording/translation may be manually or automatically delivered to an authorized party. For example, a participant communicating via a text address, such as in text field 408A, may later access customer communication device 104 to cause recording server 108 to obtain a recording of an associated communication, or portion thereof in which they participated or otherwise have permission to access. Accordingly, the participant may authenticate with an email account maintained in email field 404 for the associated participant in user field 402 and, if successful, obtain the recording or translation. Additionally or alternatively, the conclusion of a conference may cause recording server 108 or server 114 to automatically deliver a notification and/or the contents of a recording and/or translation to an email address, maintained in email field 404, for participants based on the utilized text field 408.

Figure 5:
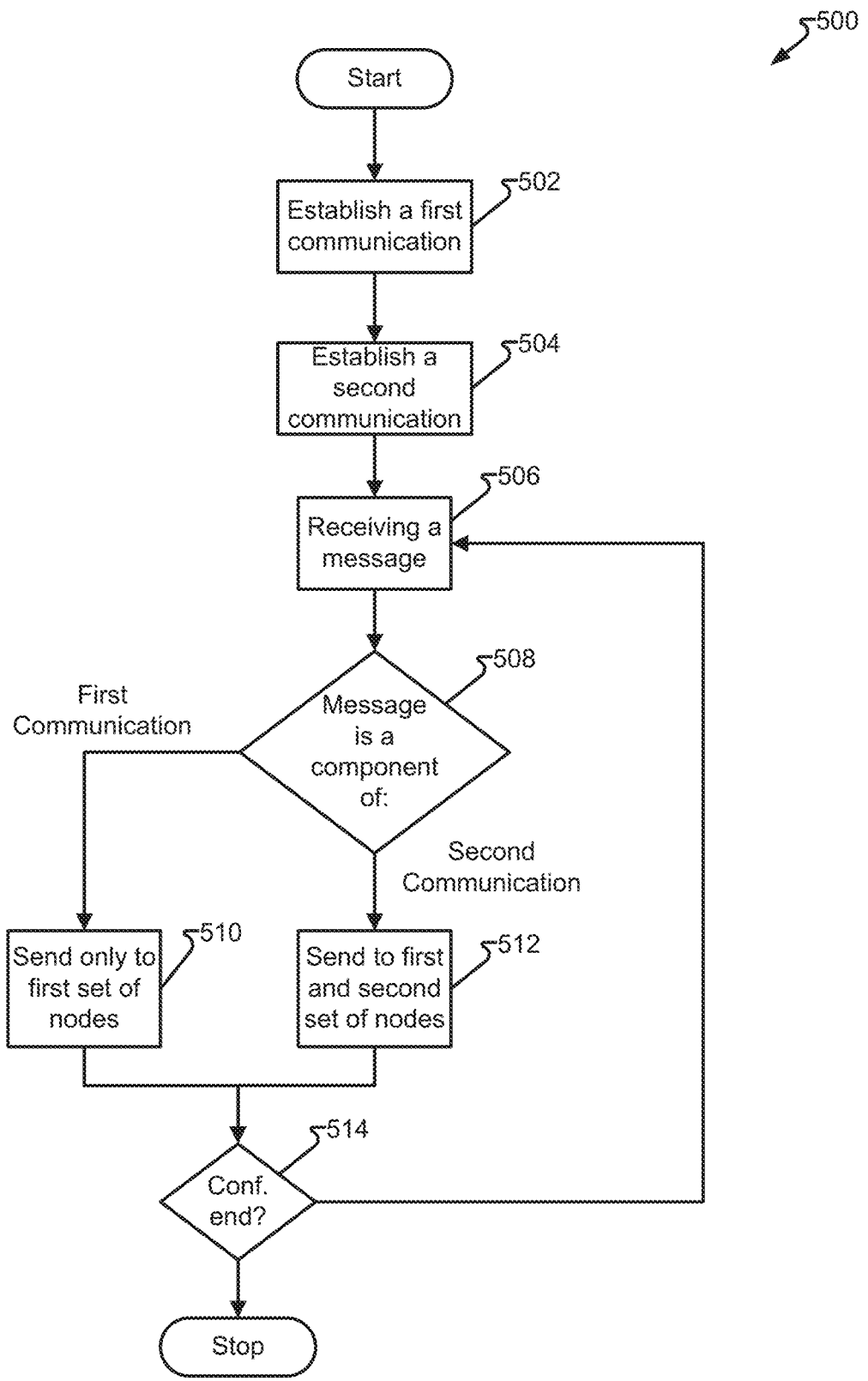
FIG. 5 depicts a process in accordance with embodiments of the present disclosure.

FIG. 5 depicts process 500 in accordance with embodiments of the present disclosure. In one embodiment, process 500 may be encoded as machine-readable instructions and maintained in a non-transitory data storage for execution by a processor, such as a processor of server 114, one or more endpoints 106, or a combination thereof. Process 500 begins and establishes a first communication between conference participants at step 502, such as conference participants (e.g., endpoint 106A and endpoint 106B). Next, step 504 establishes a second communication, such as with an aggregate of the conference participants, the aggregate then communicating with a non-conference participant, such as additional node 118.

Step 506 receives a draft of a message, such as via an application executed on one of endpoint 106. Test 508 determines which communication the message is a component of. Test 508 may prompt the message creator to expressly indicate which communication. Additionally or alternatively, all communications that occur prior to initiating the second communication may be considered messages of the first communication. Messages that are created after creation of the second communication may trigger a prompt to specify the communication. As a further embodiment, an indication may be received from one of endpoint 106 indicating that the second communication has concluded and, as a result, all subsequent communications are considered first communications. If a subsequent second communication is initiated, then messages may again prompt for an indication of which communication the message is to be a component of.

If test 508 determines that the messages is a component of the first communication, then step 510 routes the message received in step 506 to conference participants only (e.g., each of endpoint 106). If test 508 determines that the message is a component of the second communication, then in step 512, the message received in step 506 is routed to the conference participants and any additional nodes, such as additional node 118. Test 514 may determine if the conference has ended and, if so, process 500 terminates, otherwise processing may continue such as back to step 506.

Figure 6:
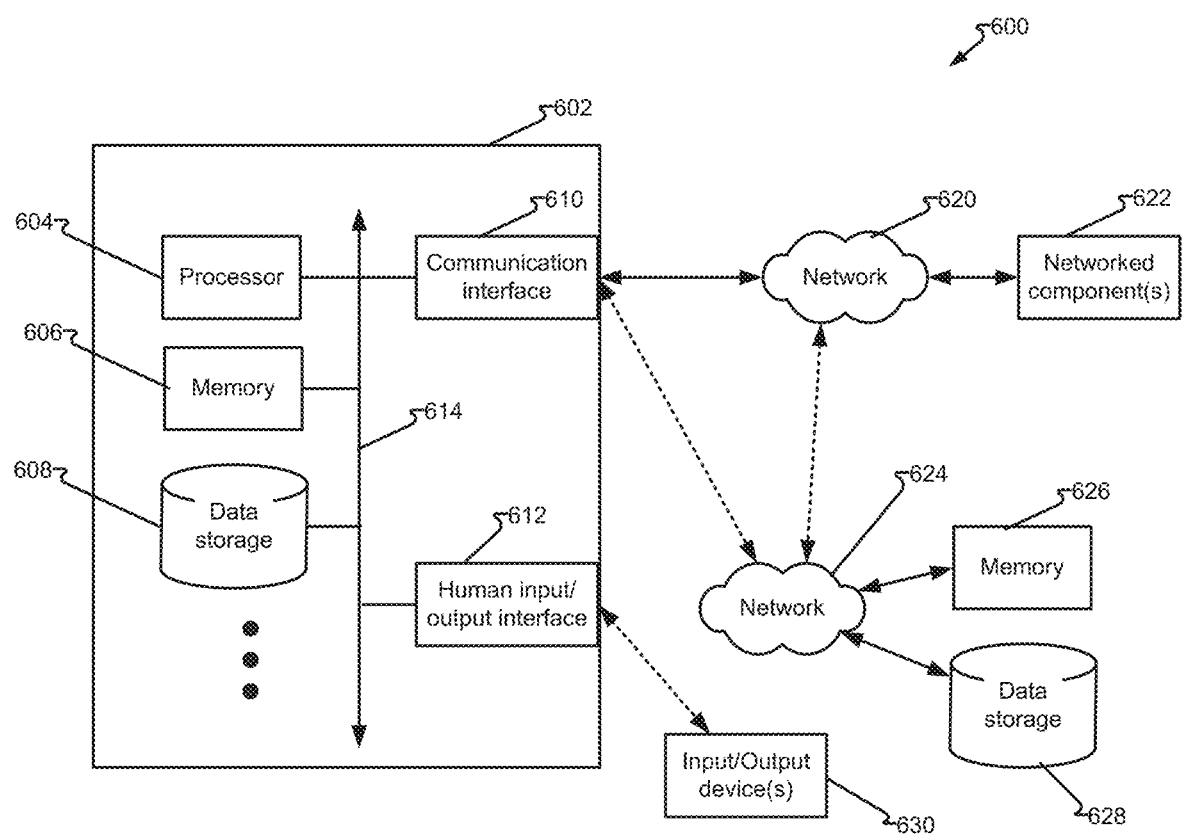
FIG. 6 depicts a device of a second system in accordance with embodiments of the present disclosure.

FIG. 6 depicts device 602 in system 600 in accordance with embodiments of the present disclosure. In one embodiment, endpoint 106 may be embodied, in whole or in part, as device 602 comprising various components and connections to other components and/or systems. The components are variously embodied and may comprise processor 604. Processor 604 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 604) and the hardware and other circuitry thereof.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, etc. In another embodiment, communication interface 610 may comprise, or be comprised by, human input/output interface 612. Communication interface 610 may be configured to communicate directly with a networked component or utilize one or more networks, such as network 620 and/or network 624.

Network 112, or individual portions network 112A and/or network 112B, may be embodied, in whole or in part, as network 620. Network 620 may be a wired network (e.g., Ethernet), wireless (e.g., WiFi, Bluetooth, cellular, etc.) network, or combination thereof and enable device 602 to communicate with network component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIVI926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more participants' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a conferencing entity node;
a first server comprising at least one processor comprising instructions maintained in a non-transitory memory and a network interface to a network; and
a recording server;
wherein the first server performs:
establishing a first communication between a first set of endpoints comprising at least three endpoints, wherein a first message from any one endpoint of the first set of endpoints is provided to each other endpoint of the first set of endpoints, exclusively; and
while the first communication is established, establishing a second communication between a second set of endpoints comprising an additional endpoint and the conferencing entity node, the conferencing entity node having an address on the network for sending and receiving messages thereon and aggregating each of the first set of endpoints such that a second message sent as a portion of the second communication, and sent from the additional endpoint to the conferencing entity node, is forwarded to each member of the first set of endpoints, and the second message, originated from one of the first set of endpoints, is provided to the conferencing entity node and sent therefrom to the additional endpoint and the remaining ones of the first set of endpoints; and wherein a third message from one of the first set of endpoints sent via the first communication remains excluded from being sent to the additional endpoint; and wherein the recording server performs:
  recording both the first communication and the second communication;
  providing access to an address associated with each participant of each of the first set of endpoints and omitting access to any address associated with a participant of the additional endpoint, to enable access to the recording of the first communication and the second communication; and
  providing access to an address associated with the participant of the additional endpoint, to enable access to the recording of the second communication and omitting access to the recording of the first communication by the additional endpoint.

2. The system of claim 1, wherein the first communication differs from the second communication with respect to at least one of a communication host utilized, a message format, a message protocol, a communication setup protocol, security protocol, or encryption.

3. The system of claim 1, wherein the first set of endpoints comprises the recording server.

4. The system of claim 1, wherein the recording is a textual transcription.

5. The system of claim 2, wherein the second communication occurs during the first communication.

6. The system of claim 1, wherein the first server further performs:
  receiving a message draft from one of the first set of endpoints;
  causing a prompt to be presented on the one of the first set of endpoints to select a destination comprising the first communication or the second communication;
  upon receiving a reply to the prompt indicating the first communication, sending the message draft to the first set of endpoints; and
  upon receiving the reply to the prompt indicating the second communication, sending the message draft to the second set of endpoints.

7. The system of claim 1, wherein the first server performs the establishing of the second communication between the second set of endpoints comprising the additional endpoint and the conferencing entity node, further comprising performing:
  formatting an invitation message to join a conference;
  sending the invitation message to the additional endpoint; and
  upon receiving indicia of acceptance in response to the invitation message, establishing the second communication.

8. The system of claim 7, wherein the first server performs formatting the invitation message further comprising automatically inserting previously determined text.

9. The system of claim 7, wherein the first server performs formatting the invitation message further comprising:
  causing at least one of the first set of endpoints to present a prompt to provide indicia of the conferencing entity node; and
  in response to receiving a response to the prompt to identify the conferencing entity node, formatting the invitation message to indicate the invitation message is from the indicia of the conferencing entity node.

10. A method, comprising:
establishing a first communication between a first set of endpoints comprising at least three endpoints, wherein a first message from any member of the first set of endpoints is provided to all other members of the first set of endpoints, exclusively; and while the first communication is established, establishing a second communication between a second set of endpoints comprising an additional endpoint and a conferencing entity node, the conferencing entity node having an address on a network for sending and receiving messages thereon and aggregating each of the first set of endpoints such that, a second message, sent from the additional endpoint to the conferencing entity node, is forwarded to each member of the first set of endpoints, and the second message, originating from one of the first set of endpoints, is provided to the conferencing entity node and sent therefrom to the additional endpoint and the remaining ones of the first set of endpoints;

recording both the first communication and the second communication;

sending, to an address associated with each participant of each of the first set of endpoints and omitting any address associated with a participant of the additional endpoint, the recording of the first communication and the second communication;

sending, to an address associated with a participant of the additional endpoint, the recording of the second communication and omitting sending the recording of the first communication to the address associated with the participant of the additional endpoint; and wherein a third message from one of the first set of endpoints sent via the first communication remains excluded from being sent to the additional endpoint.

11. The method of claim 10, wherein the first communication differs from the second communication with respect to at least one of a communication host utilized, a message format, a message protocol, a communication setup protocol, security protocol, or encryption.

12. The method of claim 10, wherein the recording further comprises creating a textual transcription.

13. The method of claim 10, further comprising:
  receiving a message draft from one of the first set of endpoints;
  causing a prompt to be presented on the one of the first set of endpoints to select a destination comprising the first communication or the second communication;
  upon receiving a reply to the prompt indicating the first communication, sending the message draft to the first set of endpoints; and
  upon receiving the reply to the prompt indicating the second communication, sending the message draft to the second set of endpoints.

14. The method of claim 10, wherein establishing of the second communication between the second set of endpoints comprising the additional endpoint and the conferencing entity node further comprises:
  formatting an invitation message to join a conference;
  sending the invitation message to the additional endpoint; and upon receiving indicia of acceptance in response to the invitation message, establishing the second communication.

15. The method of claim 14, wherein formatting the invitation message further comprises automatically inserting previously determined text.

16. The method of claim 14, wherein formatting the invitation message further comprises:
causing at least one of the first set of endpoints to present a prompt to provide indicia of the conferencing entity node; and
in response to receiving a response to the prompt to identify the conferencing entity node, formatting the invitation message to indicate the invitation message is from the indicia of the conferencing entity node.

17. A system, comprising:
means to establish a first communication between a first set of endpoints comprising at least three endpoints, wherein a first message from any member of the first set of endpoints is provided to all other members of the first set of endpoints, exclusively;
means to, while the first communication is established, establish a second communication between a second set of endpoints comprising an additional endpoint and a conferencing entity node, the conferencing entity node having an address on a network for sending and receiving messages thereon and aggregating each of the first set of endpoints such that a second message, sent from the additional endpoint to the conferencing entity node, is forwarded to each member of the first set of endpoints, and the second message, originated from one of the first set of endpoints, is provided to the conferencing entity node and sent therefrom to the additional endpoint and the remaining ones of the first set of endpoints;
means to record both the first communication and the second communication;
means to send, to an address associated with each participant of each of the first set of endpoints, and means to not send, to any address associated with a participant of the additional endpoint, the recording of the first communication and the second communication; and
means to send, to an address associated with a participant of the additional endpoint, the recording of the second communication; and
wherein a third message from one of the first set of endpoints sent via the first communication remains excluded from being sent to the additional endpoint; and
wherein the first communication differs from the second communication with respect to at least one of a communication host utilized, a message format, a message protocol, a communication setup protocol, security protocol, or encryption.

18. The system of claim 17, wherein the first communication comprises text.

19. The system of claim 17, wherein the second communication comprises text.

20. The system of claim 17, the means to establish the second communication between the second set of endpoints comprising the additional endpoint and the conferencing entity node, further comprising:
means to format an invitation message to join a conference;
means to send the invitation message to the additional endpoint; and
means to, upon receiving indicia of acceptance in response to the invitation message, establish the second communication.

\* \* \* \* \*